Sept. 26, 1933.  A. DEWANDRE  1,928,248
SUBORDINATE CONTROL DEVICE ACTING BY REACTION FOR USE IN SERVOMOTORS
Filed Feb. 15, 1929   2 Sheets-Sheet 1

Inventor
A. Dewandre
by [signature]
Atty.

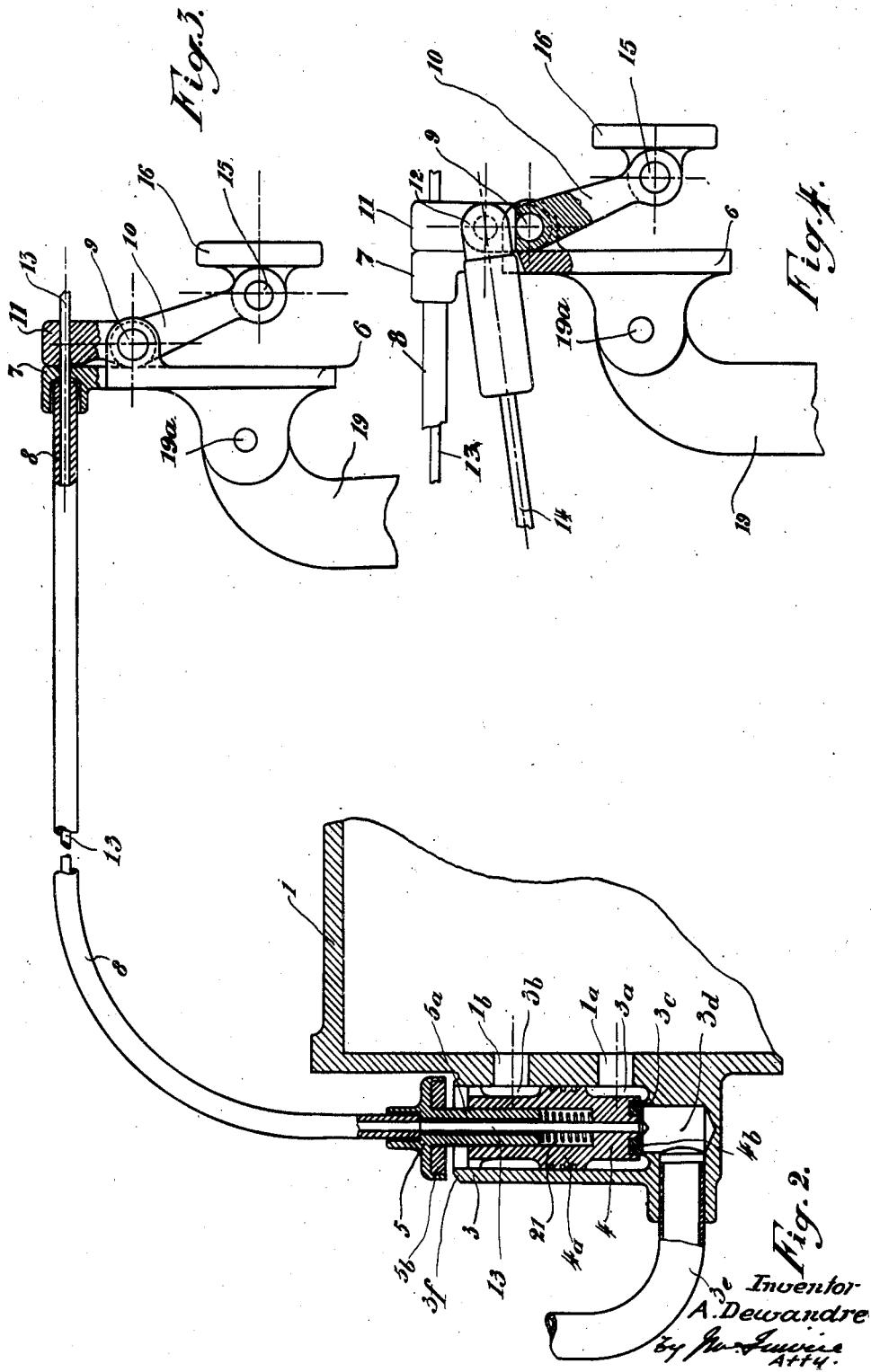

Patented Sept. 26, 1933

1,928,248

UNITED STATES PATENT OFFICE 1,928,248

SUBORDINATE CONTROL DEVICE ACTING BY REACTION FOR USE IN SERVO-MOTORS

Albert Dewandre, Liege, Belgium

Application February 15, 1929, Serial No. 340,294, and in Belgium December 6, 1928

3 Claims. (Cl. 188—152)

This invention is directed to the provision of a subordinate control device for use in connection with servo-motors designed more particularly for operating the brakes of motor vehicles, the control device being governed through the reactive effect of the servo-motor.

The primary object of the present invention is the provision of a brake-operating member to be operated by the driver for the control of the motive fluid of the auxiliary motor, with the connections providing that the braking effect exerted by the motor is in part transmitted to the member to permit the driver to be at all times advised of the intensity of the braking effect of the motor.

The invention is illustrated in the accompanying drawings, wherein:—

Figure 2 is an enlarged broken sectional view illustrating more particularly the fluid pressure control device for the servo-motor.

Figure 3 is a broken view in elevation, partly in section, showing the operating device for the distributor and illustrating more particularly the distributor connections.

Figure 4 is a similar view illustrating more particularly the connections between the operating device and the piston of the servo-motor.

Figure 1:
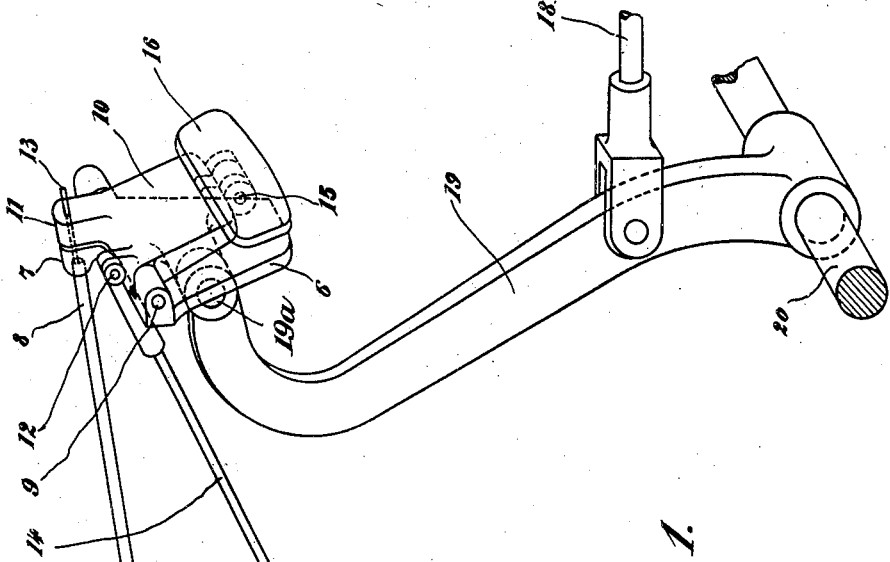
Figure 1 is a more or less diagrammatic view partly in perspective and partly in section illustrating the invention.
Figure 1:
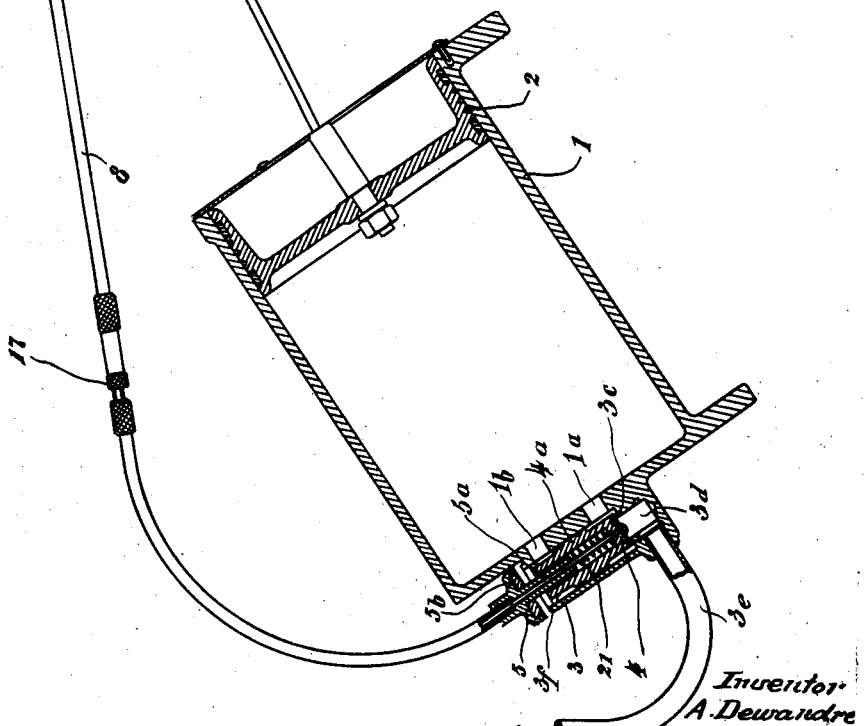

The invention includes a servo-motor of any preferred or conventional type, here illustrated as including a cylinder 1 with a piston 2 operative therein. The closed end of the cylinder is provided with spaced ports 1a and 1b, the first of which is designed as the port through which the power is in communication with the interior of the cylinder, and the second of which serves as the vent or exhaust port. In the instance illustrated, the power for operating the piston is provided through the suction created in a remote source as, for example, where the device is used in connection with brakes on a motor vehicle, the piston will be operated through the suction created in the intake manifold of the engine, as is well understood in this type of device. Where the power to operate the piston is created by suction on one side of the piston, thus unbalancing the normal atmospheric pressures on both sides of the piston, it is, of course, apparent that the balance is established and the piston held in any predetermined position by the admission of atmospheric pressure to the suction side of the piston. Therefore, for the purposes of this description, and with particular regard to the more familiar use of the invention, the port 1a will be hereinafter referred to as the suction port and the port 1b hereinafter referred to as the atmospheric vent.

Preferably integral with the closed end of the cylinder there is formed a valve casing 3, this casing covering an area including both the suction port and atmospheric vent and being closed at the bottom or beyond the suction port and open at the top or beyond the atmospheric vent. The valve casing presents interior areas of different diameters, the lower area 3d being of smaller diameter and being in open communication with the pipe 3e leading to a source of suction as, for example, the intake manifold of the engine, the upper and greater length of the interior of the valve casing being of increased diameter and including the area in communication with the suction port and atmospheric vent. The wall defining the area 3d of the valve casing is formed at its upper end to provide a valve seat 3c, this seat being slightly below the suction port 1a leading to the cylinder 1.

A valve 4 is slidable within the enlarged area of the valve casing, this valve including a body having a central area 4a slidably fitting the interior of the valve casing and provided with packing to prevent leakage. The valve body above and below the central portion is of somewhat less diameter than that of the portion of the valve casing in which it operates, thereby providing an annular chamber 3a about the valve and in open communication with the suction port 1a and a further annular chamber 3b surrounding the valve and in open communication with the atmospheric vent 1b, the latter chamber 3b being in open communication with the open end of the valve casing. The suction port 1a and atmospheric vent 1b are at all times closed against each other interiorly of the valve casing by the sealing cooperation of the valve with said casing, it being understood, however, that in all possible movements of the valve the chamber 3a is always in communication with the suction port 1a and the chamber 3b is always in communication with the atmospheric vent 1b. The lower end of the valve 4 is designed for valve cooperation with the valve seat 3c at the upper end of the chamber 3d, the valve 4 being, if desired, provided with suitable packing material 4b to insure accurate sealing action of the valve with its seat.

The valve 4, as it obviously controls communication between the suction pipe 3e and the suction port 1a of the cylinder 1 will be hereinafter termed the suction valve. The suction valve 4 is formed with a longitudinal bore opening through the end remote from the chamber 3d and terminating short of the end adjacent said chamber. A valve 5 is mounted for longitudinal movement in the bore of the valve 4, this valve 5 including a stem 5a slidable in the bore of the valve 4 and an annular enlargement at the upper end of the stem provided with a suitable packing 5b. The enlargement of the valve 5 is sufficient to overlie the upper end of the valve casing 3, this upper end of the valve casing being formed to provide a valve seat 3f with which the packing 5b may cooperate to seal the upper end of the valve casing.

As the valve 5 obviously controls communication between the atmospheric vent 1b of the cylinder and the atmosphere through the chamber 3b and the open end of the valve casing, such valve will be hereinafter termed the atmospheric valve. Arranged in the longitudinal bore of the valve 4 and bearing between the closed end of the bore and the end of the stem 5a of the valve 5 is a coiled spring 21, the function of which is to normally maintain the valve packing 5b free of the valve seat 3f, or in other words to normally maintain open communication between the atmosphere and the atmospheric vent 1b of the cylinder.

The usual or conventional brake pedal 19 terminating at the upper end in a plate 6 is mounted for swinging movement at the lower end on a shaft or appropriate mounting 20 is connected in the usual manner through the intermediary of rod 18 with the brake operating mechanism (not shown). The plate 6 may be, and preferably is, connected to the brake pedal by a pivotal connection 19a in order that in the movement of the brake pedal under the influence of the piston 2, the normal angle of the plate 6 with relation to the foot piece may be maintained for comfort. That is to say, the relation of the foot on the foot piece 16 hereinafter referred to, and thereby the relation of the foot to the plate 6 will not be changed in the movement of the lever 19, as would otherwise be the case if the plate 6 were rigidly connected to the lever. Pivotally supported on a shaft 9 mounted in ears projecting from the upper end of the pedal plate 6 is the auxiliary pedal 10. This pedal 10 is formed with an upstanding lug 11 and with a further lug 12 at one side of and in the same vertical plane as the lug 11. The plate 6 of the pedal 19 is provided with an upstanding projection 7 in alignment with the lug 11 of the auxiliary pedal so that in the inoperative position of the auxiliary pedal, as illustrated in Figure 3, the lugs 7 and 11 are in contact and that portion of the auxiliary pedal below the pivot 10 diverges from the plate 6, whereby to permit movement of the free end of the auxiliary pedal toward the plate 6 to separate the lugs 7 and 11. The lower end of the auxiliary pedal 10 is provided with a foot piece 16 swingingly supported on the lower end of the auxiliary pedal at 15. The lug 12 of the auxiliary pedal is connected by a cable 14 with the piston 2 of the servo-motor.

The control means for the suction and atmospheric valves previously described involve a Bowden cable including a sheath 8 and the cable proper 13 slidable longitudinally of the sheath. The sheath 8 is fitted at one end in an appropriate channel in the lug 7 of the plate 6 of the main pedal, the opposite end of the sheath being fitted in a channel in the upper end or in an extension of the annular enlargement of the atmospheric valve 5. Thus one end of the sheath is anchored with respect to the pedal 19 and the other end anchored with respect to the atmospheric valve 5. The cable element 13 of this Bowden cable passes loosely through the lug 7 and is fixed in any appropriate manner in a channel in the lug 11 of the auxiliary pedal 10. The opposite end of the cable passes loosely through the valve 5 and through the suction valve 4 beyond the valve 5, being welded beyond the suction valve, as indicated in Figure 2.

In the normal position of the parts, as indicated in Figures 2 and 3, it is noted that the piston 2 of the servo-motor is balanced as the atmospheric vent 1b is opened to the atmosphere through the normal open position of valve 5 under the influence of the spring 21. The lugs 7 and 11 of the plates 6 and auxiliary pedal 10 respectively are in contact. Assuming that it is desired to operate the servo-motor as, for example, for the purpose of setting the brakes, the driver pressing upon the foot piece 16 moves the lower end of the auxiliary pedal 10 toward the plate 6 of the brake pedal 19 and thus moves the lug 11 away from the lug 7. This movement is toward the right as the parts are shown in Figure 3. This movement exerts a pull upon the Bowden cable 13, thereby tending to cause the cable 13 to shorten as between the lugs 7 and the valve 4. As the sheath 8 must necessarily follow the cable 13, the shortened effect of the cable 13 by the movement described tends toward straightening the sheath 8 to compensate for the cable movement. As the end of the sheath connected to the plate 6 is fixed, this attempt of the sheath at straightening results in moving that end of the sheath connected to the valve 5 in a direction to close this valve against the tension of the spring 21. Thus the initial movement of the auxiliary pedal is to close the atmospheric valve, suction valve 4 being held to its seat by suction and pressure of the spring 21 during this closing of the atmospheric valve. As the movement continues, however, the cable 13 is drawn upon, and following the closing of the atmospheric valve, obviously opens the suction valve 4. Suction is immediately communicated to cylinder 1 through the port 1a and the piston is operated.

The movement of the piston under the suction serves through the cable 14 to exert a pull upon the auxiliary pedal 10 through the connection of the cable 14 and lug 12 of said auxiliary pedal. This pull of the cable 14 acts through the brake pedal 19 to set the brake to the extent permitted by the then set of the device. Under the pull of the cable 14, the auxiliary pedal 10 swings about the pivot point 15 of the foot piece as a fulcrum, and obviously in this swinging there is a relaxation in the pull on the Bowden cable 13 and the suction valve 4 is permitted to close, the spring 21 now acting on the suction valve as the atmospheric valve 5 is held closed by the Bowden sheath 8. This movement continues until the suction valve 4 is completely closed, when the brakes are held in the then set position.

If it is desired to release the brakes, pressure on the foot piece 16 is released to the desired extent, permitting the projection 11 of the auxiliary pedal to move toward the pedal 7 of the plate 6. This releases the Bowden wire, with the effect to increase relatively the length of said wire within the sheath and thus permit the sheath to have relative movement at the ends to compensate for this increased length of Bowden cable with the effect of permitting the spring 21 to raise the atmospheric valve and vent the interior of the cylinder to the atmosphere, balancing the pressure on the piston and permitting the usual return springs of the brakes to release the latter.

If leakage should occur in any such position of the servo-motor, such leakage is automatically corrected, for under the leakage there is a tendency to permit a movement of the auxiliary pedal in a direction to space the lugs 7 and 11. This movement of the auxiliary pedal will, of course, through the described operation of the Bowden cable 13 open the suction valve 4 and create additional suction in the cylinder 1 until the leakage is balanced, when the parts assume their normal set position. Of course, any desired braking effect within the limit of the apparatus may be secured either at once or in successive steps by appropriate operation of the auxiliary pedal 10 through the foot piece or pad 16.

It will thus be apparent that each position of the foot piece 16, that is, of the connected end of the auxiliary pedal, results in a predetermined position of the brake pedal and a predetermined application of the brakes. Thus the control device is entirely subordinate, as will be obvious. The mechanism described obviously insures that any effort necessary to operate the control device or distributor increases in proportion as the braking effect produced by the servo-motor increases. Thus the auxiliary pedal 10 is in any predetermined position properly balanced with respect to the torque exerted by the driver toward the left at the pivot point 15, the torque exered by the pull of the piston at the point 12 and which is toward the left, and the torque exerted at the pivot point 9 of the auxiliary pedal, which latter torque is, of course, the reaction of the braking force. Any increase in the vacuum or suction value in the cylinder 1 will necessarily result in an increase of the torque transmitted from the piston to the point 12 and thereby increasing the torque exerted at the point 15, thus creating a reaction in a direction opposite to the pressure exerted by the driver so that the driver can physically appreciate and know the braking torque exerted on the vehicle.

If desired, and as preferred, a turnbuckle 17 or like adjusting element may be arranged in the sheath 8 of the Bowden wire connection to provide for that adjustment in the length of the sheath as will insure a proper control of the valves.

Having thus described the invention, what is claimed as new is:—

1. A brake operating mechanism including a servo-motor, a distributor for controlling said motor and including an atmospheric valve and a suction valve, a brake pedal, a plate pivotally carried by the pedal and responsive to manual pressure, a Bowden wire connection having the sheath connected to the atmospheric valve and to the brake pedal and the cable within the sheath connected to the suction valve and to the plate, and a connection between the operative member of the servo-motor and the plate.

2. A brake operating mechanism including a servo-motor, a distributor for controlling said motor and including an atmospheric valve and a suction valve, a brake pedal, a plate pivotally carried by the pedal and responsive to manual pressure, a Bowden wire connection having the sheath connected to the atmospheric valve and to the brake pedal and the cable within the sheath connected to the suction valve and to the plate, and a connection between the operative member of the servo-motor and the plate, said connection forming the sole means leading from the servo-motor and affording servo-motor effect on the brakes.

3. A brake operating mechanism including a servo-motor, a distributor for controlling said motor and including an atmospheric valve and a suction valve, a brake pedal, a plate pivotally carried by the pedal and responsive to manual pressure, a Bowden wire connection having the sheath connected to the atmospheric valve and to the brake pedal and the cable within the sheath connected to the suction valve and to the plate, and a connection between the operative member of the servo-motor and the plate, the connection between the operative member of the servo-motor and the plate acting on the plate in opposition to the manual pressure thereon to provide for a reaction on the plate proportional to the braking action produced by the servo-motor.

ALBERT DEWANDRE.